Jan. 15, 1924.
C. W. LE NOVE
1,480,825
FRUIT PICKER
Filed April 4, 1922
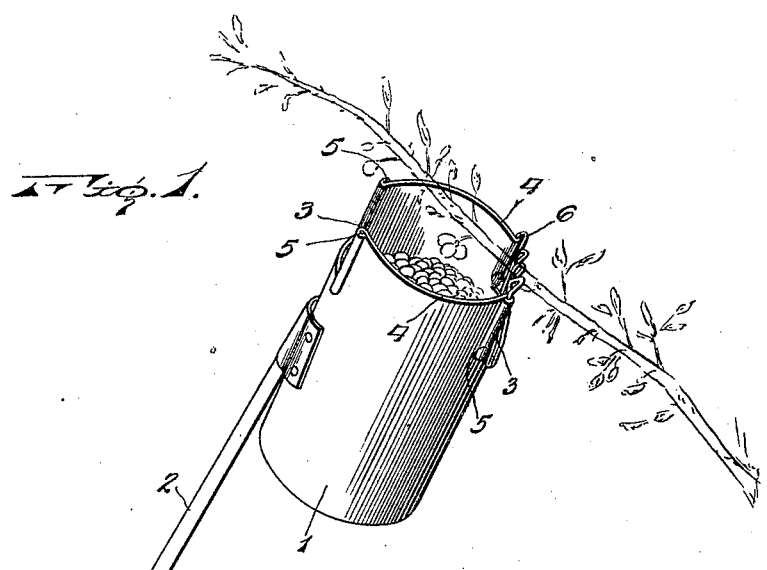
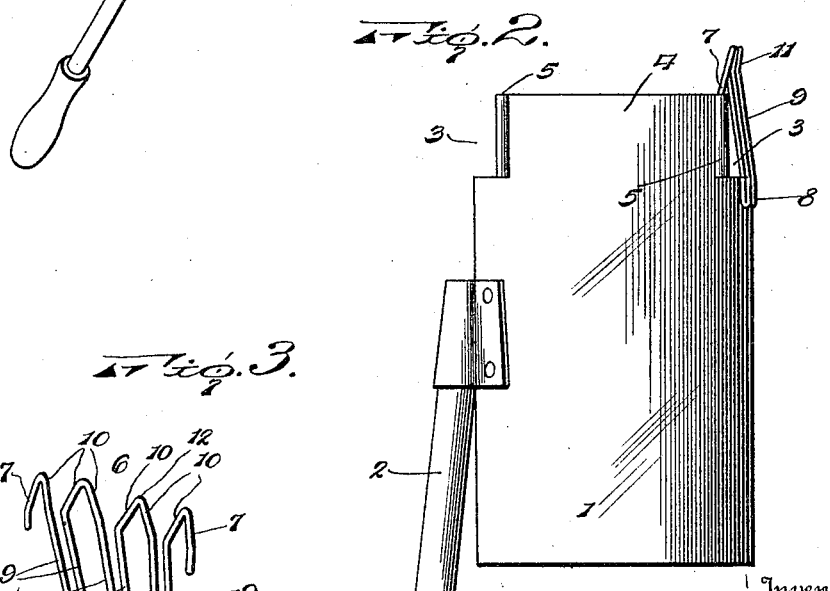
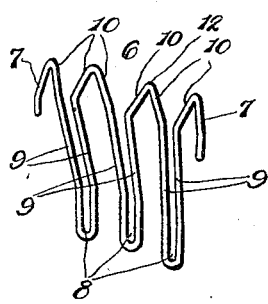
Inventor
C. W. LeNove.
By Lacey & Lacey, Attorneys Patented Jan. 15, 1924.

1,480,825

UNITED STATES PATENT OFFICE.

CYRIL W. LE NOVE, OF KENT, MINNESOTA.

FRUIT PICKER.

Application filed April 4, 1922. Serial No. 549,649.

*To all whom it may concern:*

Be it known that I, CYRIL W. LE NOVE, a citizen of the United States, residing at Kent, in the county of Wilkin and State of Minnesota, have invented certain new and useful Improvements in Fruit Pickers, of which the following is a specification.

My invention relates to devices for gathering fruit and has for its object the provision of a simple and inexpensive device which may be easily drawn along the limbs of a tree or bush so as to strip fruit or berries therefrom without injuring the limb or the leaves thereon. The invention also seeks to provide a device of such construction that the fruit or berries will be prevented from escaping over the sides of the receptacle and will be caused to drop into the receptacle with certainty. Other objects of the invention will appear incidentally in the course of the following description.

In the accompanying drawings which illustrate one embodiment of my invention—

Figure 1 is a perspective view of the picker in operative position;

Fig. 2 is an enlarged side view thereof;

Fig. 3 is a detail perspective view of the stripper.

In carrying out my invention, I employ a receptacle 1 which may be in the form of a cylindrical body of any desired capacity and has a handle 2 secured thereto. This handle may, of course, be of any desired length and disposed at any angle accordingly as the device is to be used for gathering fruit from large trees or stripping berries from low bushes. The cup or receptacle 1 is provided with open spaces 3 at its upper end at diametrically opposite points, the material of the cup between the said spaces forming guards 4 to prevent the fruit or berries which are gathered from escaping over the sides of the receptacle. The edges of these extended portions or guards 4 are rolled, as indicated at 5, whereby a smooth round surface is presented to the stem or limb of the bush or tree and injury thereto is avoided. The space 3 immediately over or in alinement with the handle 2 is left clear and unobstructed, but within the space at the rear of the cup is provided the stripper 6. As shown most clearly in Fig. 3, this stripper consists of a resilient wire or light rod bent back and forth upon itself between its ends and having its ends 7 free to be engaged in the upper ends of the rear beads or rolls 5 so as to prevent said ends injuring the fruit or the leaves of the plant or becoming entangled with adjacent objects. The intermediate portions of the stripper present U-shaped bends 8 which bear against the outer side of the cup and are secured thereto by brazing or other similar means. Above these bends 8, the stripper presents parallel straight members 9 which are inclined slightly toward the interior of the cup whereby berries of fruit stripped from the plants upon which they are growing will be caused to drop into the cup in an obvious manner. The adjacent parallel straight members 9 merge at their upper ends into diverging portions 10 which form ways in which the limb or branch being stripped may rest without injury. These diverging portions 10 are inclined slightly outward, as shown at 11 in Fig. 2, so that the leaves of the plant may readily pass over them and it will be noted that the said portions 10 between the respective members 9 are joined by means of the wire, as indicated at 12, so that there are no sharp or rough points presented anywhere by the stripper to injure the leaves or the branches or stems of the plant.

In the use of the device, the cup is brought into position with the limb or branch to be stripped passing through the space 3 and lying between the guards 4. The stripper will be caused to engage the limb or stem so that the latter will rest upon and between two diverging surfaces 10 of the stripper with the fruit in advance of the adjacent parallel portions 9 below the engaged stem or branch. The receptacle is then pulled or pushed along the stem or branch so that the fruit or berries will be successively engaged by the straight inclined parallel portions 9 of the stripper which present bights to receive the stems of the fruit but prevent the fruit or berries passing. Consequently, as the cup is moved toward the end of the engaged branch, the berries will be stripped therefrom and will drop into the cup. My device is exceedingly simple in its construction and may be produced at a very low cost while it will be found highly efficient in use.

Having thus described the invention, what is claimed as new is:

1. A fruit picker comprising a cup having diametrically opposite open spaces in its upper end and having its upper end unobstructed, a handle attached to the cup below one of said spaces, and a stripper secured upon the cup and extending across the opposite one of said spaces.

2. A fruit picker comprising a cup having diametrically opposite branch-receiving open spaces in its upper edge and having its upper end wholly unobstructed, and a stripper extending across one of said open spaces and presenting ways to receive a branch and fruit-removing bights depending from said ways, the side walls of said open spaces presenting convex surfaces to the branch received therein.

3. A fruit picker comprising a cup provided with diametrically opposite open spaces at its upper end, and a stripper extending across one of said spaces and consisting of a resilient strand forming parallel sided bights between its ends and diverging ways at the upper ends of each bight, the ends of the strand and the bights being secured to the cup and the intermediate portions of the bights being inclined inwardly over the edge of the cup.

In testimony whereof I affix my signature.

CYRIL W. LE NOVE. [L. S.]